(12) United States Patent
Haseyama et al.

(10) Patent No.: US 8,974,563 B2
(45) Date of Patent: Mar. 10, 2015

(54) EXHAUST GAS PURIFICATION SYSTEM

(75) Inventors: Takashi Haseyama, Fujisawa (JP);
Shinji Gotou, Fujisawa (JP); Hiroyuki Oohira, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 87 days.

(21) Appl. No.: 13/703,224

(22) PCT Filed: Jun. 10, 2011

(86) PCT No.: PCT/JP2011/063320
§ 371 (c)(1),
(2), (4) Date: Dec. 10, 2012

(87) PCT Pub. No.: WO2011/155585
PCT Pub. Date: Dec. 15, 2011

(65) Prior Publication Data
US 2013/0074458 A1    Mar. 28, 2013

(30) Foreign Application Priority Data

Jun. 11, 2010 (JP) ................................. 2010-134511

(51) Int. Cl.
B01D 50/00       (2006.01)
B01D 39/20       (2006.01)
(Continued)

(52) U.S. Cl.
CPC .......... B01D 46/0063 (2013.01); F01N 3/0253 (2013.01); F01N 9/002 (2013.01);
(Continued)

(58) Field of Classification Search
CPC ....... Y02T 10/47; F01N 9/002; F01N 3/0253; F02D 41/029
See application file for complete search history.

(56) References Cited

U.S. PATENT DOCUMENTS

2003/0140623 A1\*  7/2003  Ootake ............................ 60/297
2008/0104946 A1\*  5/2008  Wang et al. ...................... 60/295
(Continued)

FOREIGN PATENT DOCUMENTS

JP        5-44433      2/1993
JP        2004-162612  6/2004
(Continued)

OTHER PUBLICATIONS

Patent Abstracts of Japan, Publication No. 2005-282545, Published Oct. 13, 2005.

(Continued)

Primary Examiner — Amber Orlando
(74) Attorney, Agent, or Firm — Staas & Halsey LLP

(57) ABSTRACT

An exhaust gas purification system includes a diesel particulate filter ("DPF") which collects particulate matter ("PM") in exhaust gas, an exhaust pipe injector which performs exhaust pipe injection, and a DPF regeneration control unit which performs temperature rise control of an exhaust gas temperature by the exhaust pipe injection to regenerate the DPF when the PM collected by the DPF exceeds a fixed amount and which, during the regeneration, integrates an amount of time during which the exhaust gas temperature exceeds a PM combustion temperature and completes the regeneration when an integrated value thereof reaches a set regeneration completion value. The DPF regeneration control unit aborts the regeneration when, during regeneration, a total amount of the exhaust pipe injection exceeds an upper limit before the integrated value.

6 Claims, 2 Drawing Sheets

(51) Int. Cl.
*B01D 39/14* (2006.01)
*B01D 39/06* (2006.01)
*B01D 24/00* (2006.01)
*B01D 46/00* (2006.01)
*F01N 3/025* (2006.01)
*F01N 9/00* (2006.01)
*F01N 11/00* (2006.01)
*F02D 41/02* (2006.01)

(52) U.S. Cl.
CPC .............. *Y02T 10/47* (2013.01); *F01N 11/002* (2013.01); *F01N 2550/04* (2013.01); *F02D 41/029* (2013.01); *F02D 2200/0625* (2013.01); *F02D 2200/0812* (2013.01); *F02D 2200/604* (2013.01)
USPC ................ 55/282.3; 55/522; 55/523; 55/524; 422/169; 422/170; 422/171; 422/172; 422/177; 422/178; 422/179; 422/180; 422/181; 422/182

(56) References Cited

U.S. PATENT DOCUMENTS

| | | | |
|---|---|---|---|
| 2009/0025372 A1* | 1/2009 | Onodera et al. | 60/286 |
| 2009/0082938 A1* | 3/2009 | Onodera et al. | 701/103 |
| 2009/0266060 A1* | 10/2009 | Guo et al. | 60/295 |
| 2010/0024395 A1* | 2/2010 | Gotou et al. | 60/277 |
| 2010/0089032 A1* | 4/2010 | Iwashita et al. | 60/274 |
| 2011/0004559 A1* | 1/2011 | Shibamori et al. | 705/307 |
| 2011/0066354 A1* | 3/2011 | Cassani et al. | 701/103 |

FOREIGN PATENT DOCUMENTS

| | | |
|---|---|---|
| JP | 2004-155574 | 6/2005 |
| JP | 4175281 | 10/2005 |
| JP | 2007-231759 | 9/2007 |

OTHER PUBLICATIONS

Patent Abstracts of Japan, Publication No. 05-044433, Published Feb. 23, 1993.
Patent Abstracts of Japan, Publication No. 2004-162612, Published Jun. 10, 2004.
Patent Abstracts of Japan, Publication No. 2005-155574, Published Jun. 16, 2005.
Patent Abstracts of Japan, Publication No. 2007-231759, Published Sep. 13, 2007.
International Search Report of PCT/JP2011/063320 mailed Sep. 13, 2011.
Written Opinion of the International Searching Authority mailed Sep. 13, 2011 in corresponding International Application No. PCT/JP2011/063320.

* cited by examiner

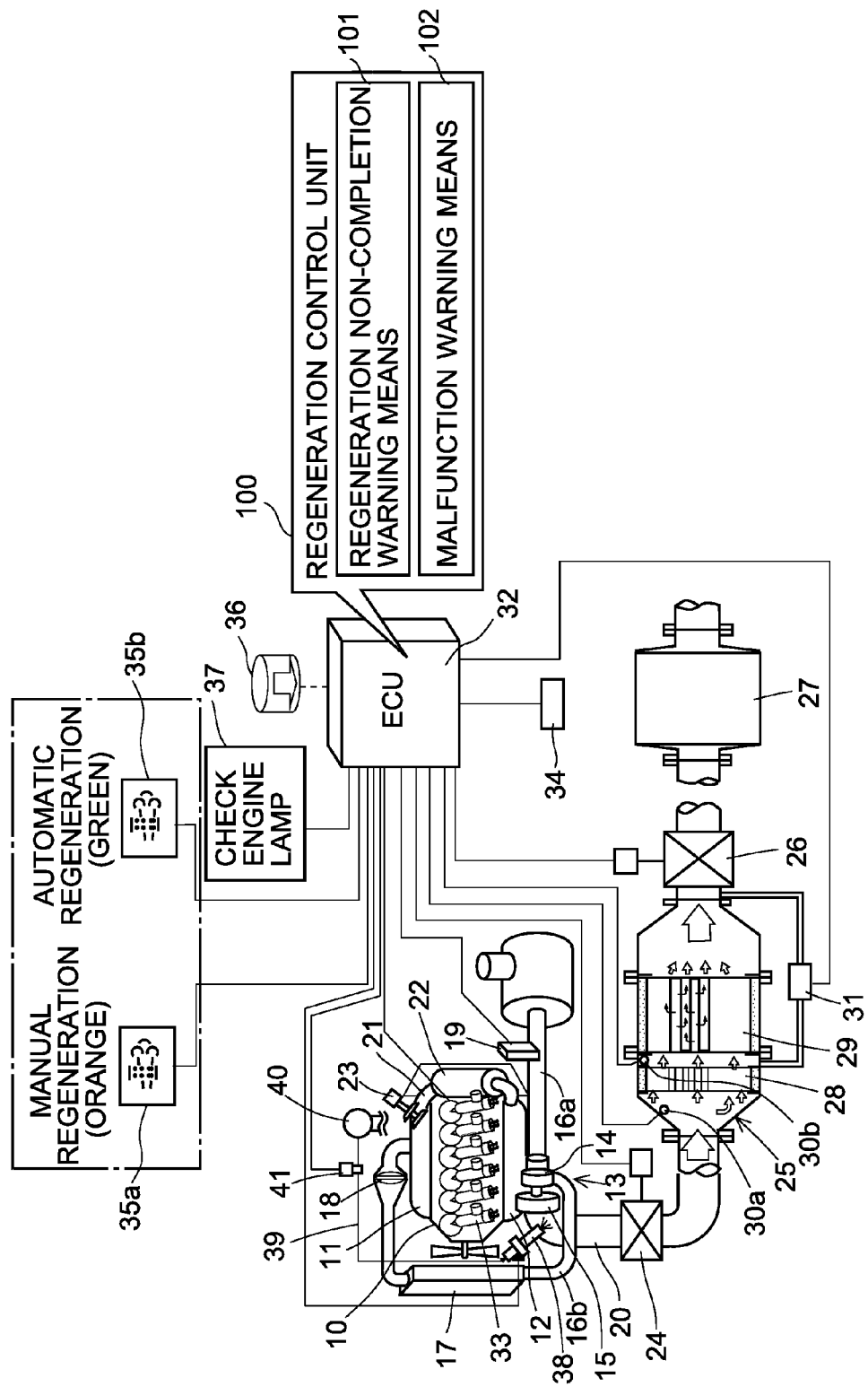

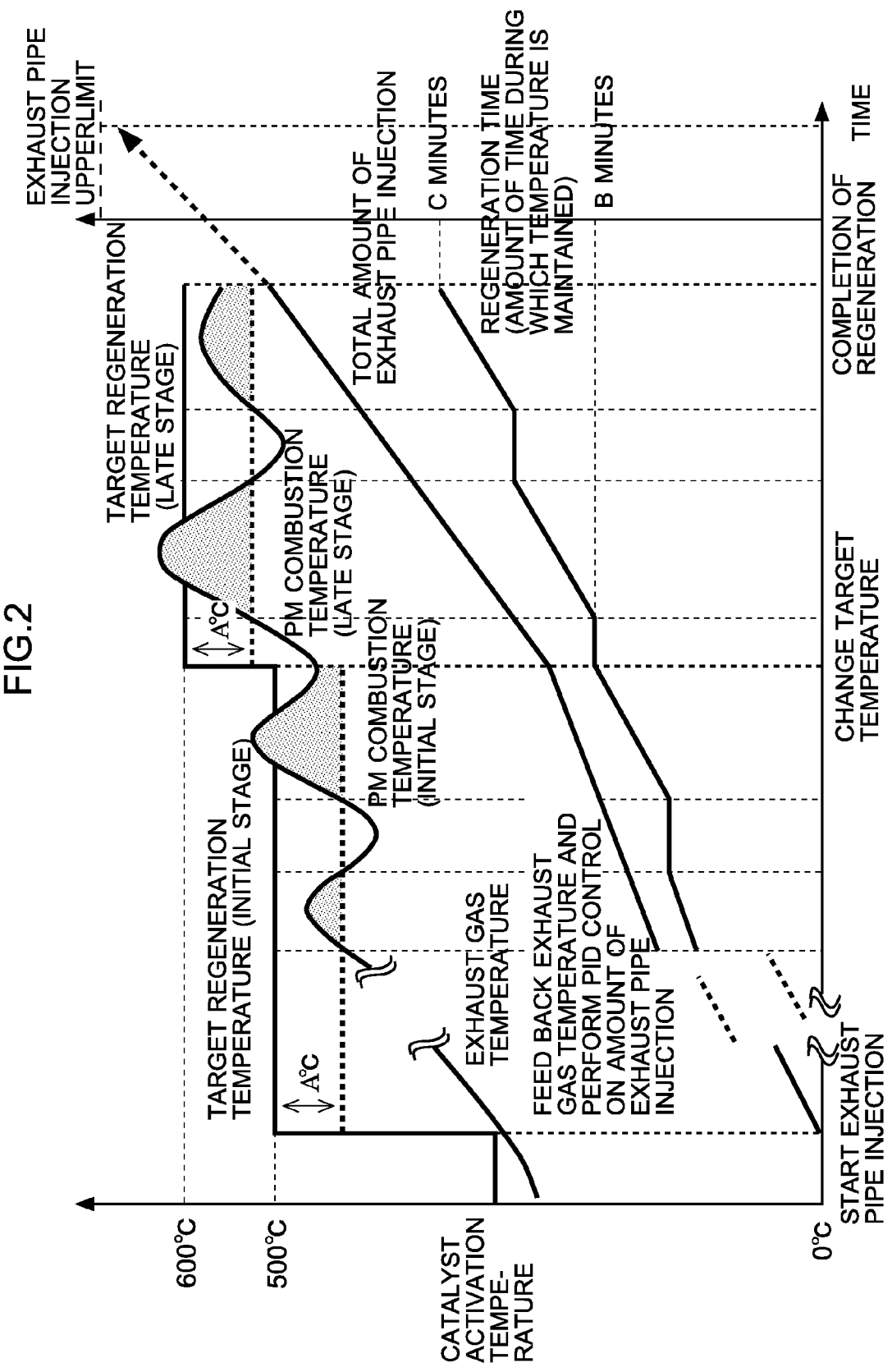

EXHAUST GAS PURIFICATION SYSTEM

CROSS-REFERENCE TO RELATED APPLICATIONS

This application claims the foreign priority benefit of Japanese Application No. 2010-134511 filed Jun. 11, 2010, the contents of which are incorporated herein by reference, which serves as priority for PCT Application No. JP2011/063320 filed Jun. 10, 2011.

TECHNICAL FIELD

The present invention relates to an exhaust gas purification system that collects PM (Particulate Matter) in exhaust gas from a diesel engine.

BACKGROUND ART

Exhaust gas purification systems have been developed which collect PM in exhaust gas from a diesel engine using a DPF (Diesel Particulate Filter) such as a DPD (Diesel Particulate Defuser) that is a type of DPF to reduce an amount of PM that is discharged to the outside (for example, refer to Patent Document 1).

Examples of such an exhaust gas purification system include a continuous regeneration DPF system in which a DOC (Diesel Oxidation Catalyst) is provided upstream of a DPF.

PM collected from the exhaust gas and accumulated in the DPF causes clogging of the DPF and reduces exhaust gas purification efficiency. Therefore, when the amount of PM accumulated in the DPF reaches or exceeds a fixed amount, DPF regeneration is performed in which a temperature of the exhaust gas is raised (for example, to around 500 to 600° C.) and the PM is forcibly removed by combustion (oxidation).

An amount of PM accumulation is estimated from an output value of a differential pressure sensor that measures a difference in exhaust pressure before and after the DPF. When the output value of the differential pressure sensor exceeds a predetermined differential pressure, an ECU (Engine Control Unit) assumes that the amount of PM accumulation has exceeded a predetermined amount, and either the ECU automatically starts DPF regeneration while a vehicle is in motion (automatic regeneration) or, after a DPF warning light 35a has been turned on, a driver stops the vehicle and pushes a regeneration execution switch to start DPF regeneration (manual regeneration).

In addition, there may be cases where an amount of PM accumulation is detected based on travel distance instead of on a difference in exhaust pressure before and after the DPF. In this case, DPF regeneration is automatically or manually started as described above when the travel distance exceeds a predetermined distance.

Upon start of DPF regeneration, a fuel injector of a diesel engine is controlled and an engine-out exhaust gas temperature is raised by multistage injection. Once DOC temperature has been sufficiently raised, unburnt fuel is added to the exhaust gas, and by combustion of a fuel component thereof with the DOC, a temperature of the exhaust gas flowing out from the DOC is raised to a target regeneration temperature (for example, to around 500 to 600° C.). Accordingly, the PM collected by the DPF is forcibly removed by combustion.

In doing so, feedback control of the exhaust gas temperature is performed using a signal from a temperature sensor provided on the DPF, and an addition amount of the unburnt fuel necessary for raising the temperature of the exhaust gas to the target regeneration temperature and maintaining the exhaust gas at the target regeneration temperature is constantly adjusted by PID (proportional-integrated derivation) control.

Means for adding the unburnt fuel described above can be divided into: post-injection in which fuel is once again injected into a cylinder from a fuel injector after a power stroke and unburnt fuel is added to exhaust gas remaining in the cylinder; and exhaust pipe injection in which unburnt fuel is added from an exhaust pipe injector provided at an exhaust pipe between an engine and a DPF to exhaust gas discharged from the engine and flowing through an exhaust pipe.

While post-injection enables a conventional diesel engine and a conventional exhaust gas purification system to be utilized as-is, since the unburnt fuel is directly injected into a cylinder, a problem of oil dilution occurs in that engine oil is contaminated and diluted by a fuel component and an ensuing decline in a lubricating function causes scorching of a cylinder and the like.

On the other hand, with DPF regeneration by exhaust pipe injection, the oil dilution described above no longer becomes a concern and DPF regeneration can be performed according to an amount of PM collected by a DPF.

PRIOR ART DOCUMENTS

Patent Document 1: Japanese Patent Publication No. 4175281

With an exhaust gas purification system using exhaust pipe injection, since oil dilution is not a concern during DPF regeneration as described above, exhaust pipe injection can be performed until DPF regeneration is completed without having to set an upper limit to a total amount of exhaust pipe injection.

However, during automatic regeneration, when a situation continues where a temperature rise of exhaust gas is insufficient (for example, a traffic jam in which stop-start movement is performed), since temperature rise control becomes unstable and the temperature of the exhaust gas is not sufficiently raised, there is a risk that the temperature of the exhaust gas may not reach a temperature required for combustion of PM. In this case, a total amount of exhaust pipe injection used for temperature rise control may increase abnormally before DPF regeneration is completed.

In addition, even in a case where a failure occurs in various devices used for DPF regeneration (an exhaust pipe, a DOC which burns unburnt fuel and raises exhaust gas temperature, and the like) and raising the temperature of the exhaust gas becomes difficult, there is a risk that exhaust pipe injection may be carried out endlessly in order to perform DPF regeneration and cause a decline in gas mileage.

SUMMARY OF THE INVENTION

In consideration thereof, an object of the present invention is to provide an an exhaust gas purification system which is capable of appropriately aborting DPF regeneration to suppress a decline in gas mileage in a vehicle condition where temperature rise control of exhaust gas becomes unstable when the DPF regeneration is performed using exhaust pipe injection.

The present invention has been made in order to achieve the object described above, and is an exhaust gas purification system including a DPF which is provided in an exhaust pipe of a diesel engine and which collects PM in exhaust gas, an exhaust pipe injector which is provided in the exhaust pipe upstream of the DPF and which performs exhaust pipe injection into the exhaust pipe, and a DPF regeneration control unit which performs temperature rise control of an exhaust gas temperature by the exhaust pipe injection to regenerate the DPF when the PM collected by the DPF exceeds a fixed amount and which, during the generation, integrates an amount of time during which the exhaust gas temperature exceeds a PM combustion temperature and completes the regeneration when an integrated value thereof reaches a set regeneration completion value, wherein the DPF regeneration control unit determines, during the regeneration, an injection amount of exhaust pipe injection that attains a predetermined temperature that is higher than the PM combustion temperature, and aborts the regeneration when a total amount of the exhaust pipe injection exceeds an exhaust pipe injection upper limit during the regeneration.

With the exhaust gas purification system according to the present invention, when DPF regeneration is performed using exhaust pipe injection, the DPF regeneration can be appropriately aborted to suppress a decline in gas mileage in a vehicle condition where temperature rise control of the exhaust gas becomes unstable.

BRIEF DESCRIPTION OF THE DRAWINGS

FIG. 1 is a system diagram showing a configuration of an exhaust gas purification system.

FIG. 2 is a diagram illustrating operations of the exhaust gas purification system.

DETAILED DESCRIPTION

Hereinafter, preferred embodiments of the present invention will be described with reference to the accompanying drawings.

FIG. 1 is a system diagram showing an exhaust gas purification system according to the present embodiment.

In FIG. 1, an intake manifold 11 and an exhaust manifold 12 of a diesel engine 10 are respectively coupled to a compressor 14 and a turbine 15 of a supercharger (turbocharger) 13. Pressure of air from an upstream intake pipe 16a is raised by the compressor 14, and the air is cooled when passing through an intercooler 17 of a downstream intake pipe 16b and supplied from the intake manifold 11 to the diesel engine 10 via an intake throttle (intake throttle valve) 18. Exhaust gas from the diesel engine 10 drives the turbine 15 and is subsequently discharged to an exhaust pipe 20.

The upstream intake pipe 16a is provided with an MAF (Mass Air Flow) sensor 19 which measures an intake volume. The MAF sensor 19 controls a degree of opening of the intake throttle 18 to adjust the intake volume. In addition, an EGR pipe 21 for returning a part of the exhaust gas to an intake system of the diesel engine 10 to reduce $NO_x$ is connected to the intake manifold 11 and the exhaust manifold 12, and an EGR cooler 22 and an EGR valve 23 are connected to the EGR pipe 21.

An exhaust brake valve 24, a DPF 25, an exhaust throttle (exhaust throttle valve) 26, and a silencer 27 are connected to the exhaust pipe 20. The DPF 25 includes a DOC 28 made of an active catalyst that oxidizes unburnt fuel and a CSF (Catalyzed Soot Filter) 29 which collects PM in exhaust gas.

An exhaust pipe injector 38 which injects fuel (exhaust pipe injection) into the exhaust pipe 20 in order to raise exhaust gas temperature during DPF regeneration is provided upstream of the exhaust brake valve 24. A fuel filter 40 which removes foreign substances and moisture mixed into or created in fuel is connected to a fuel supply line 39 which supplies fuel to the exhaust pipe injector 38 from a fuel tank (not shown), and a fuel pressure sensor 41 which measures fuel pressure of the exhaust pipe injector 38 is provided downstream of the fuel filter 40.

In addition, although not shown in FIG. 1, an SCR device is connected between the exhaust throttle 26 and the silencer 27. The SCR device is a device which performs purification by causing $NO_x$ in exhaust gas to react with $NH_3$ to create $N_2$ and $H_2O$.

Exhaust gas temperature sensors 30a and 30b which are used to determine whether or not exhaust pipe injection is being performed and to determine an exhaust pipe injection amount and completion of DPF regeneration are provided before and after the DOC 28. In addition, a differential pressure sensor 31 for measuring a difference in exhaust gas pressure before and after the CSF 29 is provided in order to estimate an amount of PM accumulation in the CSF 29.

Output values from these sensors are inputted to an ECU 32 which provides overall control of operations of the diesel engine 10 and which performs DPF regeneration, and the fuel injector 33 of the diesel engine 10, the exhaust throttle 26, the exhaust brake valve 24, the EGR valve 23, the exhaust pipe injector 38, and the like are controlled according to control signals outputted from the ECU 32.

Information such as an accelerator position from an accelerator position sensor, an engine rotation speed from a rotation speed sensor, a vehicle speed from a vehicle speed sensor 34 as well as information such as an engine cooling water temperature are also inputted to the ECU 32 to be used for operations of the diesel engine 10.

In addition, a DPF warning light 35a for manual regeneration and a DPF warning light 35b for automatic regeneration which are provided in a cabin, a regeneration execution switch 36 used by a driver when executing manual regeneration, a check engine lamp 37 which is turned on when a failure of some kind or another occurs in the diesel engine 10 in order to notify a user of the failure, and the like are connected to, and controlled by, the ECU 32.

In this system, air passes through the MAF sensor 19 of the upstream intake pipe 16a, the air is pressurized by the compressor 14 of the supercharger 13 and is cooled when passing through the intercooler 17 of the downstream intake pipe 16b, and enters a cylinder of the diesel engine 10 from the intake manifold 11 via the intake throttle 18.

On the other hand, exhaust gas created inside the cylinder passes through the exhaust manifold 12 and drives the turbine 15 and is then purified by an exhaust gas purification system that includes the DPF 25 and the SCR device, and is silenced by the silencer 27 and discharged into atmosphere. A part of the exhaust gas is cooled by the EGR cooler 22 and is subjected to volume adjustment by the EGR valve 23, and is circulated to the intake manifold 11.

The exhaust gas includes PM which is collected by the DPF 25. Normally, so-called DPF regeneration in which NO in the exhaust gas is oxidized by the DOC 28 to create $NO_2$, the PM collected by the downstream CSF 29 is oxidized by the $NO_2$ to create $CO_2$, and the PM is removed from the CSF 29 is being continuously carried out at the DPF 25.

However, when exhaust gas temperature is low, since the temperature of the DOC 28 drops and activation of the DOC 28 does not occur, an oxidation reaction is not promoted and DPF regeneration cannot be performed by oxidizing the PM. As a result, accumulation of the PM in the CSF 29 continues and clogging of the filter proceeds.

With respect to such filter clogging, the exhaust gas temperature is forcibly raised when the amount of PM accumulation exceeds a predetermined amount of accumulation to forcibly remove the PM collected by the CSF 29 by combustion.

Since the amount of PM accumulation is proportional to an output value of the differential pressure sensor 31, when the output value of the differential pressure sensor 31 exceeds a predetermined differential pressure (differential pressure threshold), the ECU 32 detects clogging of the filter and either automatically performs DPF regeneration or turns on the DPF warning light 35*a* and prompts the driver to perform DPF regeneration by pressing the regeneration execution switch 36. DPF regeneration whose start timing is determined based on differential pressure in this manner is referred to as differential pressure-based regeneration. Hereinafter, DPF regeneration that is automatically performed by the ECU 32 will be referred to as automatic regeneration and regeneration that is manually performed by the driver will be referred to as manual regeneration.

Moreover, besides using the output value of the differential pressure sensor 31, the start timing of DPF regeneration may be determined depending on whether or not a travel distance that is calculated based on a vehicle speed measured by the vehicle speed sensor 34 exceeds a predetermined distance (distance threshold). DPF regeneration whose start timing is determined based on travel distance in this manner is referred to as distance-based regeneration.

Examples of manual regeneration and automatic regeneration will be described.

Manual regeneration is performed when the vehicle is stationary. After the vehicle is stopped, as a user presses the regeneration execution switch 36 to start manual regeneration, the fuel injector 33, the diesel engine 10, the exhaust brake valve 24, the EGR valve 23, and the intake throttle 18 are controlled by the ECU 32 and the exhaust gas temperature is raised to a temperature at which the DOC 28 is activated.

More specifically, the ECU 32 controls the fuel injector 33 to start multistage injection, controls the diesel engine 10 to increase an engine rotation speed, closes the exhaust brake valve 24 to ensure a rapid temperature rise, closes the EGR valve 23 to prevent backflow of fuel, and controls the intake throttle 18 to reduce intake volume so as to suppress a temperature drop while increasing load.

Moreover, a determination of activation of the DOC 28 is made when a detected value of the exhaust gas temperature sensor 30*a* that is upstream of the DOC 28 equals or exceeds an upstream threshold set in advance and, at the same time, a detected value of the exhaust gas temperature sensor 30*b* that is downstream of the DOC 28 equals or exceeds a downstream threshold set in advance. In other words, a determination of activation of the DOC 28 is made based on respective detected values of the exhaust gas temperature sensors 30*a* and 30*b* that are upstream and downstream of the DOC 28.

Once the DOC 28 is activated, the exhaust pipe injector 38 is controlled to start exhaust pipe injection together with multistage injection, the exhaust brake valve 24 is opened and the exhaust throttle 26 is closed, and the exhaust gas temperature is further raised to a target temperature.

At this point, for example, the target temperature is set in two stages to a target regeneration temperature (initial stage) and a target regeneration temperature (late stage) that is higher than the target regeneration temperature (initial stage), and is controlled by the ECU 32 so that each target temperature is maintained for a predetermined amount of time. The target temperature is set in multiple stages in order to prevent the CSF 29 from melting due to heat generated by combustion of PM. In other words, the target temperature is set low in an initial stage of DPF generation where PM remains in a large amount because more heat is generated by the combustion of the PM, and the target temperature is set high in a late stage of DPF generation where a smaller amount of PM remains due to combustion in order to ensure efficient combustion of the PM.

Subsequently, the ECU 32 controls the fuel injector 33 and restores the fuel injector 33 to normal injection, closes the exhaust pipe injector 38, controls the diesel engine 10 to restore the engine rotation speed to a normal idling state, opens the exhaust throttle 26, restores the EGR valve 23 to normal (open), and restores the intake throttle 18 to normal (open). As a result, the exhaust gas temperature drops and manual regeneration ends.

With manual regeneration described above, since DPF regeneration is performed when the vehicle is stationary, the exhaust gas temperature can be stably maintained and combustion of PM can be performed in an efficient and reliable manner. On the other hand, during manual regeneration, the vehicle must be stopped and a predetermined stand-by period must be set aside.

Next, automatic regeneration will be described.

Automatic regeneration is performed when the vehicle is in motion. When automatic regeneration is started by the ECU 32, the ECU 32 controls the fuel injector 33, the diesel engine 10, the EGR valve 23, and the intake throttle 18 and raises the exhaust gas temperature to a temperature at which the DOC 28 is activated. Unlike manual regeneration, since automatic regeneration is performed when the vehicle is moving, the exhaust brake valve 24 cannot be closed. However, the exhaust brake valve 24 is closed when the vehicle becomes stationary such as when stopping at a red light to increase exhaust pressure and raise or maintain the exhaust gas temperature.

Once the DOC 28 is activated (a criterion of determination of activation of the DOC 28 is the same as described earlier), the exhaust pipe injector 38 is controlled to start exhaust pipe injection together with multistage injection and the exhaust gas temperature is further raised to a target temperature. Since the exhaust throttle 26 can also not be closed due to the vehicle being in motion, the exhaust throttle 26 is always opened.

Subsequently, once the exhaust gas temperature rises to the target temperature and is maintained at the target temperature for a predetermined amount of time, the ECU 32 controls the fuel injector 33 and restores the fuel injector 33 to normal injection, closes the exhaust pipe injector 38, controls the diesel engine 10 to restore the engine rotation speed to normal, restores the EGR valve 23 to normal (open), and restores the intake throttle 18 to normal (open). As a result, the exhaust gas temperature drops and automatic regeneration ends.

With automatic regeneration described above, since DPF regeneration is performed while the vehicle is in motion, greater convenience than manual regeneration is offered. However, with automatic regeneration, the exhaust gas temperature remains unstable or rises only slowly and there is a tendency that exhaust pipe injection amount increases while gas mileage declines compared to manual regeneration.

As shown, since automatic regeneration and manual regeneration both have advantages and disadvantages, it is favorable to appropriately select and use both automatic regeneration and manual regeneration as the situation demands.

Selection of automatic regeneration or manual regeneration is made based on a regeneration interval that is a distance traveled between end of DPF regeneration and start of a next DPF regeneration. Specifically, when the regeneration interval is under a set manual regeneration threshold, the driver is prompted to perform manual regeneration.

A decrease in regeneration interval or, in other words, accumulation of PM in the DPF in excess of a threshold despite a short travel distance may be caused by insufficient removal of PM in a previous DPF regeneration. Therefore, when the regeneration interval is under the manual regeneration threshold, manual regeneration that enables DPF regeneration to be performed in a stable manner is selected to reliably remove PM.

Meanwhile, during automatic regeneration, when a situation continues where a temperature rise of exhaust gas is insufficient (for example, a traffic jam in which stop-start movement is performed), the temperature rise of the exhaust gas becomes insufficient. Therefore, there is a risk that most of the PM may remain unremoved by combustion due to the temperature of the exhaust gas not reaching a PM combustion temperature and a total amount of exhaust pipe injection used for temperature rise control may increase endlessly before the exhaust gas temperature is held at a target regeneration temperature for a certain amount of time and DPF regeneration is completed.

In addition, even in a case where a failure occurs in various devices used for DPF regeneration (the DOC 28 and the like) and raising the temperature of the exhaust gas becomes difficult, there is a risk that the ECU 32 may perform exhaust pipe injection endlessly in order to carry out DPF regeneration.

In consideration thereof, the exhaust gas purification system according to the present invention is configured such that the ECU 32 includes a DPF regeneration control unit 100 and, further, the DPF regeneration control unit 100 includes regeneration non-completion warning means 101 and malfunction warning means 102.

During regeneration, the DPF regeneration control unit 100 integrates an amount of time (hereinafter referred to as regeneration time) during which the exhaust gas temperature exceeds the PM combustion temperature and determines that the regeneration has been completed when an integrated value thereof reaches a set regeneration completion value and terminates the regeneration. At the same time, when a total amount of the exhaust pipe injection exceeds an exhaust pipe injection upper limit before the regeneration is completed, the DPF regeneration control unit 100 determines that the regeneration has failed and aborts the regeneration.

In addition, when the total amount of the exhaust pipe injection exceeds the exhaust pipe injection upper limit, the DPF regeneration control unit 100 determines that the regeneration has failed and activates the regeneration non-completion warning means 101 for notifying the driver of the failure.

Furthermore, when regeneration fails consecutively a predetermined number of times, the DPF regeneration control unit 100 determines that a malfunction has occurred in an instrument or a device for exhaust gas purification or, in other words, a defect has occurred in the exhaust pipe 20 itself, the DOC 28, or the like, and activates the malfunction warning means 102 for notifying the driver of a malfunction.

The present invention is not particularly limited to the regeneration non-completion warning means 101 and the malfunction warning means 102. For example, blinking of the DPF warning lights 35a and 35b as the regeneration non-completion warning means 101 and turning on the check engine lamp 37 as the malfunction warning means 102 may suffice, and configurations may be modified as appropriate using various warning means provided in the vehicle.

Advantageous effects of the present invention will now be described.

FIG. 2 illustrates operations of the exhaust gas purification system and a transition in exhaust gas temperature particularly during automatic regeneration according to the present embodiment.

When it is detected that the amount of PM collected by the DPF 25 has reached or exceeded a fixed amount, the DPF regeneration control unit 100 mounted to the ECU 32 starts temperature rise control of exhaust gas in order to regenerate the DPF 25.

The DPF regeneration control unit 100 controls the fuel injector 33 to perform multistage injection and raises an engine-out exhaust gas temperature, and when the temperature sensors 30a and 30b provided before and after the DOC 28 detect that the temperature of exhaust gas flowing into the DOC 28 has reached a catalyst activation temperature of the DOC 28, the DPF regeneration control unit 100 controls the exhaust pipe injector 38 to perform exhaust pipe injection to further raise the temperature of the exhaust gas to a target regeneration temperature and, at the same time, starts integration of an exhaust pipe injection amount.

In doing so, the DPF regeneration control unit 100 performs feedback control using a deviation of an exhaust gas temperature detected by the temperature sensor 30b from the target regeneration temperature, and an exhaust pipe injection amount necessary for maintaining the exhaust gas at the target regeneration temperature is adjusted by PID control.

In addition, when the DPF regeneration control unit 100 detects that the exhaust gas temperature is equal to or higher than a PM combustion temperature that is lower than the target regeneration temperature by a predetermined temperature (A° C.), the DPF regeneration control unit 100 determines that combustion of the PM is underway and integrates regeneration time.

For the PM combustion temperature, a minimum temperature at which combustion of PM can be guaranteed may be obtained from a simulation test or the like and used as a fixed value to perform DPF regeneration, or the DPF regeneration control unit 100 may be configured so as to be capable of appropriately varying the PM combustion temperature according to an amount of collected PM supplied from the differential pressure sensor 31 or the like.

During regeneration, when the integrated regeneration time reaches a predetermined value (B minutes), the DPF regeneration control unit 100 determines that the PM collected by the DPF 25 has been removed by combustion down to or below the fixed amount and changes a rise target temperature (in other words, the target regeneration temperature) of the exhaust gas to a high temperature-side.

Although DPF regeneration is performed at a relatively low temperature (for example, around 500° C.) in an initial stage of DPF regeneration in order to prevent excessive temperature rise and dissolution loss of the DPF 25 due to heat generated by PM combustion, by changing the target regeneration temperature to the high temperature-side (for example, around 600° C.) in a late stage where a smaller amount of uncombusted PM remains in the DPF 25, the PM can be efficiently removed by combustion.

In this case, the PM combustion temperature may be arranged so as to be variable according to the changed target temperature to a temperature that is lower by a predetermined temperature (A° C.) than the changed target temperature or may be separately set in advance from the changed target temperature to two fixed values.

In a case where temperature rise control of the exhaust gas is performed in a stable manner and the exhaust gas temperature has been sufficiently maintained at or above the PM combustion temperature, when the regeneration time integrated value reaches a set regeneration completion value (C minutes) that is set greater than the predetermined value (B minutes) at which the target regeneration temperature had been changed, the DPF regeneration control unit 100 determines that the PM collected by the DPF 25 has been sufficiently removed and that regeneration of the DPF 25 has been completed, and performs control for restoring the vehicle to a normal operating state or idling state.

On the other hand, in a case where temperature rise control of the exhaust gas during regeneration is unstable and the exhaust gas temperature has hardly been maintained at or above the PM combustion temperature, when the total amount of exhaust pipe injection exceeds the exhaust pipe injection upper limit before the regeneration time reaches the set regeneration completion value, the DPF regeneration control unit 100 determines that the regeneration has failed and performs control for restoring the diesel engine 10 to a normal operating state or idling state and, at the same time, activates the regeneration non-completion warning means 101 for notifying the driver of the non-completion of regeneration.

Accordingly, when the vehicle is not in a condition where the exhaust gas temperature can be sufficiently raised, by aborting DPF regeneration and exhaust pipe injection, a decline in gas mileage can be suppressed and the driver can be prompted to perform a next DPF regeneration in a stable manner.

In addition, when regeneration successively results in a non-completion, it is highly likely that a failure has occurred in various devices which perform temperature rise control of exhaust gas (for example, the exhaust pipe 20 itself, the DOC 28, or the like) and is causing raising the temperature of the exhaust gas to be difficult.

Therefore, when regeneration fails consecutively a predetermined number of times, the DPF regeneration control unit 100 of the exhaust gas purification system according to the present invention determines that a malfunction has occurred in an instrument or a device for exhaust gas purification, and by activating the malfunction warning means 102 for notifying the driver of the malfunction, the driver can be notified of the malfunction and prompted to immediately perform an inspection and repair.

The present invention is not limited to the embodiments described above and can obviously be modified as appropriate without departing from the spirit and scope of the present invention.

The invention claimed is:

1. An exhaust gas purification system comprising:
   a diesel particulate filter provided in an exhaust pipe of a diesel engine and which collects particulate matter in exhaust gas;
   an exhaust pipe injector provided in the exhaust pipe upstream of the diesel particulate filter to perform exhaust pipe injection into the exhaust pipe; and
   a diesel particulate filter regeneration control unit configured to perform temperature rise control of an exhaust gas temperature by the exhaust pipe injection to regenerate the diesel particulate filter when the particulate matter collected by the diesel particulate filter exceeds a fixed amount and which, during the regeneration, integrates an amount of time during which the exhaust gas temperature exceeds a particulate matter combustion temperature and completes the regeneration when an integrated value thereof reaches a set regeneration completion value,
   wherein, during the regeneration, the diesel particulate filter regeneration control unit determines an injection amount of the exhaust pipe injection that brings the exhaust gas temperature to a predetermined temperature that is higher than the particulate matter combustion temperature, integrates the injection amount of the exhaust pipe injection, and aborts the exhaust pipe injection, when a total amount of the exhaust pipe injection exceeds an exhaust pipe injection upper limit, and
   wherein the diesel particulate filter regeneration control unit is configured to change the particulate matter combustion temperature to a high temperature-side when the particulate matter collected by the diesel particulate filter has been removed by combustion down to or below the fixed amount.

2. An exhaust gas purification system, comprising:
   a diesel particulate filter provided, in an exhaust pipe of a diesel engine and which collects particulate matter in exhaust gas;
   an exhaust pipe injector provided in the exhaust pipe upstream of the diesel particulate filter to perform exhaust pipe injection into the exhaust pipe; and
   a diesel particulate filter regeneration control unit configured to perform temperature rise control of an exhaust gas temperature by the exhaust pipe injection to regenerate the diesel particulate filter when the particulate matter collected by the diesel particulate filter exceeds a fixed amount and which, during the regeneration, integrates an amount of time during which the exhaust gas temperature exceeds a particulate matter combustion temperature and completes the regeneration when an integrated value thereof reaches a set regeneration completion value,
   wherein, during the regeneration, the diesel particulate filter regeneration control unit determines an injection amount of the exhaust pipe injection that brings the exhaust gas temperature to a predetermined temperature that is higher than the particulate matter combustion temperature, integrates the injection amount of the exhaust pipe injection, and aborts the exhaust pipe injection, when a total amount of the exhaust pipe injection exceeds an exhaust pipe injection upper limit, and
   wherein the diesel particulate filter regeneration control unit is configured to determine that regeneration has failed when the total amount of exhaust pipe injection exceeds the exhaust pipe injection upper limit and activate a regeneration non-completion warning device.

3. The exhaust gas purification system according to claim 1, wherein the diesel particulate filter regeneration control unit is configured to determine that regeneration has failed when the total amount of exhaust pipe injection exceeds the exhaust pipe injection upper limit and activate a regeneration non-completion warning device.

4. The exhaust gas purification system according to claim 1, wherein the diesel particulate filter regeneration control unit is configured to determine that a malfunction has occurred in an instrument or a device for exhaust gas purification when regeneration fails consecutively a predetermined number of times, and activate a malfunction warning device.

5. The exhaust gas purification system according to claim 2, wherein the diesel particulate filter regeneration control unit is configured to determine that a malfunction has occurred in an instrument or a device for exhaust gas purification when regeneration fails consecutively a predetermined number of times, and activate a malfunction warning device.

6. The exhaust gas purification system according to claim 3, wherein the diesel particulate filter regeneration control unit is configured to determine that a malfunction has occurred in an instrument or a device for exhaust gas purification when regeneration fails consecutively a predetermined number of times, and activate a malfunction warning device.

* * * * *